United States Patent [19]

Yamamoto et al.

[11] Patent Number: 5,344,911
[45] Date of Patent: Sep. 6, 1994

[54] PROCESS FOR PRODUCING POLYOXYMETHYLENE COPOLYMER HAVING REDUCED AMOUNT OF UNSTABLE TERMINAL GROUPS

[75] Inventors: Kaoru Yamamoto; Nagayoshi Maeda; Makoto Kamiya; Toshiro Murao, all of Shizuoka, Japan; Gerhard Reuschel, Bibliss-Nordheim; Dietrich Fleischer, Darmstadt, both of Fed. Rep. of Germany

[73] Assignees: Polyplastics Co., Ltd., Japan; Hoechst Aktiengesellschaft, Fed. Rep. of Germany

[21] Appl. No.: 26,130

[22] Filed: Mar. 5, 1993

[30] Foreign Application Priority Data

Mar. 6, 1992 [JP] Japan ................................. 4-049476
Mar. 9, 1992 [JP] Japan ................................. 4-050597

[51] Int. Cl.$^5$ .......................... C08G 4/00; C08G 6/00
[52] U.S. Cl. ................................... 528/241; 528/416; 528/503
[58] Field of Search ................... 528/241, 416, 503

[56] References Cited

U.S. PATENT DOCUMENTS 4,046,738  9/1977  Sextro et al. ...................... 528/230

FOREIGN PATENT DOCUMENTS 1420292  5/1969  Fed. Rep. of Germany.

OTHER PUBLICATIONS

Patent Abstracts of Japan, vol. 7, No. 114 (C-166) (1259) 18 May 1983 & JP-A-58 034 819 (Asahi Kasei Kogyo KK) 1 Mar. 1983.
Patent Abstracts of Japan, vol. 7, No. 118 (C-167) (1263) 21 May 1983 & JP-A-58 038 713 (Asahi Kasei Kogyo KK) 7 Mar. 1983.

Primary Examiner—John Kight, III
Assistant Examiner—Terressa M. Mosley
Attorney, Agent, or Firm—Nixon & Vanderhye

[57] ABSTRACT

Processes for producing a polyoxymethylene copolymer includes forming a crude polyoxymethylene copolymer by subjecting a reaction system containing trioxane, a cyclic ether or cyclic formal comonomer, and a catalyst (e.g., boron trifluoride or a coordination compound thereof) to copolymerization reaction conditions. During copolymerization, both the total content of impurities and catalyst in the copolymerization reaction system are adjusted. In this regard, the impurities content (i.e., those compounds which form unstable end groups in the polyoxymethylene copolymer and/or those compounds having a chain-terminating or chain-transfer function) in the copolymerization reaction system is adjusted to $1 \times 10^{-2}$ mole percent or less based on the total monomer amount, while the the content of the catalyst in the copolymerization reaction system to between $1 \times 10^{-3}$ to $1 \times 10^{-2}$ mole percent based on the total monomer amount. Immediately after copolymerization has been completed, the crude polyoxymethylene copolymer is quenched to a temperature of 45° C. or less within 30 seconds after completion of copolymerization. Quenching of the crude polyoxymethylene copolymer is preferably simultaneously accompanied by deactivation of the catalyst by bringing the crude polyoxymethylene copolymer immediately following completion of copolymerization into contact with a cold liquid which contains a catalyst deactivator.

22 Claims, No Drawings

PROCESS FOR PRODUCING POLYOXYMETHYLENE COPOLYMER HAVING REDUCED AMOUNT OF UNSTABLE TERMINAL GROUPS

FIELD OF THE INVENTION

The present invention relates to a process for producing a polyoxymethylene copolymer having improved thermal stability and a high degree of polymerization. More particularly, the present invention relates to a process for producing a substantially linear polyoxymethylene copolymer having a high degree of polymerization which contains a reduced amount of unstable terminal groups (which thereby contributes to improved thermal stability characteristics).

BACKGROUND AND SUMMARY OF THE INVENTION

Polyoxymethylene (hereinafter sometimes more simply referred to as POM) copolymers have been known for a long time as engineering plastics materials. A common copolymerization process for producing POM copolymers involves copolymerizing a cyclic acetal, such as trioxane, as a main monomer, and a cyclic acetal or a cyclic ether having at least two adjacent carbon atoms as a comonomer in the presence of a cationically active catalyst. The catalyst-deactivated product is then typically subjected to a post-polymerization stabilization step whereby relatively unstable end groups are removed from the polymer chain.

The molecular weight of POM copolymers can be controlled to be below a certain level by using a suitable chain transfer agent. However, few (if any) viable proposals exist whereby a POM copolymer having a high molecular weight exceeding a certain level may be produced. Indeed, it has merely been noted in the past that copolymerization should preferably be conducted in the presence of a minimal amount of active impurities in the copolymerization system.

As a matter of course, it is preferable to minimize main chain scission during post-treatment that is typically effected after copolymerization. However, no particular method is known whereby such main chain scission may be minimized. In general, it is typically recommended that the copolymerization product be pulverized and neutralized by being brought into contact with a neutralizing agent, deactivator or a solution thereof at a relatively high temperature (for example, 50° C. or above) (see, for example, U.S. Pat. No. 2,989,509 and Japanese Patent Publication-A No. 34819/1983, the entire contents of which are expressly incorporated hereinto by reference). However, the degrees of polymerization of the POM copolymers obtained by these known processes are limited. Moreover, according to such known processes, it is highly difficult to obtain a copolymer having a high degree of polymerization and a melt index (MI) (190° C., load: 22160 g) of 2.0 g/10 min or below, in particular, from 0.1 to 1.5 g/10 min. When the copolymer thus obtained is subjected to, for example, extrusion-molding or blow-molding, the molten resin is liable to undergo drawdown due to its insufficient melt-tension characteristic and thus its moldability is considerably deteriorated. Furthermore, under the existing circumstances, the mechanical properties (particularly, toughness) of the resin and the performance and qualities of molded products prepared therefrom are restricted.

The POM copolymers obtained by these known processes generally contain a considerably large amount of unstable terminal groups and, therefore, it is necessary to stabilize these POM copolymers by removing the unstable groups in order for the POM copolymers to be used practically. Thus, a relatively complicated post-treatment process which expends considerable energy is required thereby presenting an economic disadvantage. Several advantages would thus ensue by obtaining a crude POM copolymer containing a reduced amount of unstable terminal groups immediately after copolymerization. For example, the final product would have improved stability and the post-treatment steps, including stabilization, could be simplified. Accordingly, a process which produces a copolymer containing a reduced amount of unstable terminal groups during copolymerization has been desired.

Investigations have been made on processes for producing a crude copolymer containing a reduced amount of unstable terminal groups. For example, although it is believed to be desirable to conduct copolymerization while minimizing the content of active impurities in the copolymerization system, such a technique has demonstrated limitations. Furthermore, conducting the copolymerization by incorporating a specified stabilizer into the copolymerization system has been proposed (see, for example, Japanese Patent Publication-A Nos. 227916/1984 and 1216/1985, incorporated hereinto fully by reference), but such a suggested technique is likewise not entirely satisfactory.

What has been needed in this art, therefore, is a process whereby a crude POM copolymer can be obtained which contains an extremely reduced amount of unstable terminals (thereby considerably reducing the processing load during a post-polymerization stabilization step) and having an extremely high thermal stability. It is toward fulfilling such needs that the present invention is directed.

Broadly, the present invention is embodied in a process whereby the content of both the active impurities which give rise to the unstable terminal groups in the copolymer chain, and the catalyst content are adjusted in the reaction system so as to be at a predetermined level during the copolymerization reaction so as to yield a crude POM copolymer having a reduced amount of unstable terminal groups, and thereafter quenching the obtained crude copolymer under specific conditions.

According to the present invention, a POM copolymer can be obtained having a substantially linear structure and a high degree of polymerization, containing an extremely reduced amount of unstable terminals (which relieves considerably the processing load during the post-polymerization stabilization step) as well as exhibiting excellent qualities (including mechanical properties such as toughness and an extremely high thermal stability which can rarely be obtained by known methods). In this regard, it has been discovered that such a substantially linear POM copolymer can be achieved by controlling the content of active impurities contained in the reaction system which might serve as a "chain-terminating" or "chain-transfer" agent during the copolymerization reaction, restricting the amount of a catalyst to be used in the copolymerization reaction to a specific range and further employing specific conditions for deactivating the catalyst.

In particular, it has been found that the methods for deactivating copolymerization catalysts employed in known processes are problematic and that deactivation at a relatively high temperature (for example, 50° C. or above), which has been proposed as the most adequate procedure, unexpectedly gives an adverse effect. That is, in the competition between the neutralization/deactivation of the catalyst and the decomposition caused by the residual catalyst, the latter preferentially proceeds at a high temperature. Thus, side reactions such as decomposition occur before the deactivation sufficiently proceeds and, as a result, the decomposition of the main chain by the residual catalyst occurs within a short period of time in the course of the deactivation of the copolymerization catalyst. Thus, as the decomposition of the main chain occurs, the degree of polymerization is reduced thereby resulting in newly formed unstable terminal groups prior to complete deactivation of the catalyst.

According to the present invention, therefore, it has been found that quenching the crude copolymer obtained after the completion of the copolymerization reaction (instead of heating the crude copolymer according to the conventional wisdom in this art) is actually desirable since the occurrence of side reactions, such as decomposition, will be suppressed. Thus, POM copolymer containing an extremely reduced amount of unstable components, especially a linear POM copolymer containing an extremely reduced amount of unstable terminal groups and having a high degree of polymerization can be obtained by combining this novel post-polymerization quenching procedure with the above-mentioned requirements for the copolymerization reaction.

Accordingly, a particularly preferred embodiment of the present invention relates to a process for producing a polyoxymethylene copolymer by copolymerizing trioxane as a main monomer with a cyclic ether or a cyclic formal as a comonomer in the presence of a catalyst comprising boron trifluoride or a coordination compound thereof, which is especially characterized by conducting the copolymerization while adjusting the total content of impurities (e.g., those compounds which either give rise to unstable end groups in the obtained copolymer, or those having a chain-terminating or chain-transfer function) in the reaction system to $1 \times 10^{-2}$% by mole or below based on the total amount of the monomers. Furthermore, the content of the catalyst to be used in the copolymerization is selected to be between $1 \times 10^{-3}$% to $1 \times 10^{-2}$% by mole based on the total amount of the monomers. The copolymer product obtained by the polymerization process will then be cooled (quenched) to a temperature of 45° C. or below within 30 seconds after the completion of the copolymerization reaction to thereby deactivate the catalyst.

Thus, according to the present invention, the decomposition reaction during the copolymerization reaction will be suppressed by controlling the amounts of impurities and catalyst contained in the reaction system so that each is within a predetermined level. The crude copolymer that is obtained after the completion of the copolymerization reaction will also be quenched immediately under specific conditions to thereby extremely retard and suppress side reactions, such as decomposition reactions, which would otherwise occur simultaneously with neutralization/deactivation of the catalyst.

Further aspects and advantages of this invention will become more clear after careful consideration is given to the following detailed description of the preferred exemplary embodiments.

DETAILED DESCRIPTION OF THE PREFERRED EXEMPLARY EMBODIMENTS

Those compounds which are termed "impurities" for the purpose of this invention include compounds which form unstable end groups in the resulting copolymer chain and/or compounds which either function to terminate chain growth (chain-terminating agents) or promote chain growth (chain-transfer agents). Specific examples of the active impurities which are contained in the monomers and which form unstable end groups— that is, which give rise to unstable end groups in the resulting copolymer that is obtained—during the copolymerization reaction include water, alcohols (for example, methanol) and acids (for example, formic acid). Specific examples of the active impurities contained in the monomers, which might function as a chain-terminating agent or a chain-transfer agent during the copolymerization reaction, include water, alcohols (for example, methanol), acids and esters thereof (for example, formic acid and formates) and low molecular weight linear acetals (for example, methylal). It is necessary according to the present invention that the total content of the above-noted impurities be at a level in the copolymerization reaction system of $1 \times 10^{-2}$ mole percent or less, and preferably $5 \times 10^{-3}$ mole percent or less, based on the total amount of the monomers in the reaction system. Thus, an excessively large active impurity content is undesirable since POM copolymers containing a reduced amount of unstable terminal groups and/or a high degree of polymerization (i.e., a low MI) cannot be obtained, however adequate other conditions may be.

It is, of course, desirable to control the molecular weight of the POM copolymer during copolymerization and, to this end, some arbitrary amount of a chain transfer agent which forms no unstable terminals, such as a low molecular weight linear acetal compound having alkoxy groups at both ends, e.g. methylal, may be incorporated into the reaction system according to this invention. Although the presence of a low molecular weight acetal compound having alkoxy groups at both ends, such as methylal, would not cause any increase in the amount of unstable terminals in the copolymer, it serves as a chain transfer agent and thus lowers the degree of polymerization. Thus, although the presence of a chain-transfer agent is not preferred in order to achieve the beneficial results of the present invention, if a chain transfer agent is nonetheless present, it is desirable to control its content in the reaction system so as to be below the limit as specified above.

The amount of the catalyst that is used in the copolymerization reaction is also an important requirement in the present invention. As the catalyst, boron trifluoride or a coordination compound thereof usually employed in the art may likewise be used in the practice of the present invention. It is, however, necessary to use the catalyst in an amount between $1 \times 10^{-3}$ to $1 \times 10^{-2}$ mole percent, and preferably from $1 \times 10^{-3}$ to $7 \times 10^{-3}$ mole percent, based on the total amount of the monomers. By limiting the content of the catalyst to the range defined above, a substantial decrease in the degree of polymerization and the formation of unstable terminals in the course of the copolymerization can be effectively prevented. When the amount of the catalyst exceeds $1 \times 10^{-2}$ mole percent, it becomes difficult to maintain the copolymerization temperature at a suitable level and the decomposition reaction becomes dominant, which hinders the formation of a polymer containing a reduced amount of unstable terminals. When the amount of the catalyst is less than $1 \times 10^{-3}$ mole percent, the copolymerization rate is retarded thereby reducing the polymerization yield per time and undesirably affecting the degree of polymerization.

In order to fully achieve the effects of the present invention, the copolymerization temperature is also an important factor. In this regard, it is desirable to maintain the copolymerization temperature substantially at a temperature within the range of from 60° to 105° C., and preferably from 65° to 100° C., throughout the copolymerization reaction. The copolymerization temperature closely relates to the amount of the catalyst. As a general condition, for example, a jacket temperature range generally available by using an aqueous medium on a common industrial scale can be attained by controlling the amount of the catalyst as specified above and, therefore, no specific regulation is needed in this case. Strictly speaking, however, it is desirable to maintain the copolymerization temperature within the range as specified above by considering conditions other than the amount of the catalyst, for example, secondary factors such as the scale, the structure of a polymerizer and the jacket temperature.

Conditions other than those mentioned above are not particularly restricted. Thus, the process according to this invention may be effected in accordance with virtually any known techniques.

The cyclic ether or cyclic formal that may be used as comonomer in the processes of this invention is a compound represented by the following general formula

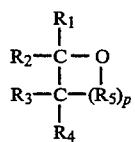

wherein, each of $R_1$, $R_2$, $R_3$ and $R_4$, which may be the same or different from each other, represents a hydrogen atom or an alkyl group, preferably a hydrogen atom; and $R_5$ represents a methylene or oxymethylene group, an alkyl-substituted methylene or oxymethylene group (in which case, p is an integer from 0 to 3, inclusive) or a divalent group represented by the formulas $-(CH_2)_q-OCH_2-$ or $-(OCH_2-CH_2)_q-OCH_2-$ (in which case, p is 1 and q is an integer from 1 to 4, inclusive).

Examples of comonomers within the scope of the definition above include ethylene oxide, 1,3-dioxolane, diethylene glycol formal, 1,4-butanediol formal, 1,3-dioxane and propylene oxide. Among these comonomers, particularly preferred examples include ethylene oxide, 1,3-dioxolane, 1,4-butanediol formal and diethylene glycol formal. According to the present invention, the content of the comonomer may range from 0.2 to 10% by weight, preferably from 0.2 to 5% by weight, and most preferably from 0.4 to 5% by weight, based on the weight of trioxane in the reaction system.

The copolymerization of the present invention can be conducted using conventional apparatus and conventional techniques as may be employed in known processes for polymerizing trioxane. More specifically, a batch process or a continuous process may be employed. Furthermore, any of the solution polymerization, melt bulk polymerization and other polymerization processing techniques may be selected. From an industrial viewpoint, it is usual and preferable to use a continuous bulk polymerization process wherein liquid monomers are employed and a solid crude copolymer in the form of a powdery mass is obtained as the polymerization proceeds. In this case, an inert liquid medium may also be present, if necessary.

The polymerization apparatus that may be used in the present invention can be in the form of a reactor provided with a stirrer in the case of batch polymerization, while a Ko-kneader, a twin-screw continuous extruder, a two-shaft paddle-type continuous mixer or the like may be used in the case of continuous polymerization. A polymerization apparatus of a closed system may include two or more stages. It is particularly preferable to use an apparatus provided with a pulverizer whereby the solid crude copolymer formed by the copolymerization reaction can be converted immediately into fine particles.

The post-treatment conditions to be effected after the copolymerization reaction has been completed are also an extremely important requirement for achieving the benefits according to the present invention. Namely, the reaction mixture (which includes solid particulate crude polyoxymethylene copolymer) discharged from the polymerizer after copolymerization has been completed should be quenched substantially to a temperature of 45° C. or lower within 30 seconds. It is preferable to cool the discharged reaction mixture (and hence the crude copolymer therein) to a temperature of 45° C. or lower within 20 seconds after the copolymerization reaction, and still preferable to cool the same substantially to a temperature ranging from 35° to 15° C. within 30 seconds.

When reference has been made herein to the reaction mixture being discharged "after completion" of copolymerization is meant to refer to that point in time during the process when the reaction mixture containing the crude polyoxymethylene is discharged physically from the substantially closed polymerizer—that is, the point at which the reaction mixture comes into contact with an oxygen- and/or moisture-containing atmosphere or a liquid medium such as water.

A higher cooling (quench) rate gives a better result and is important in reducing the holding time at which the crude POM copolymer is at a high temperature. It has been found that when the cooling rate is low or a relatively high temperature as proposed in the past (for example, 50° C. or higher) is employed, side reactions will preferentially proceed even when a neutralizing agent or a deactivator for the catalyst is immediately added. As a result, polymer decomposition and/or a decrease in the degree of polymerization caused thereby, as well as the formation of additional unstable terminal groups cannot sufficiently be suppressed and the degree of polymerization at the completion of the copolymerization cannot be maintained at an adequate level.

Since the side reactions (including polymer decomposition) more preferentially proceed at a higher temperature, the moisture contained in the ambient atmosphere with which the crude copolymer comes into contact immediately after completion of copolymerization will exert undesirable effects. That is, the side reactions are promoted by contact of the crude copolymer with moisture. It is, therefore, undesirable to expose the crude copolymer at a high temperature to a moisture-containing atmosphere, even though the moisture content may be at a typical atmospheric level. In an inert atmosphere substantially free from moisture, therefore, the degree of polymerization is minimally reduced. Such a state may be considered as a continuation of the copolymerization step and the extent of the side reactions is reduced even though the cooling rate is relatively low.

After sufficiently cooling in such a substantially moisture-free inert atmosphere, the catalyst may be deactivated by contacting the crude copolymer with a neutralizing agent or a deactivator for a sufficiently long period of time. In the presence of moisture, on the other hand, it is necessary that the crude copolymer not be maintained at a high temperature. Instead, it is necessary to rapidly cool the crude copolymer. In general, the cooling may be rapidly effected by immersing the crude copolymer in a relatively large amount of cold liquid. It is particularly effective for rapid cooling to use an aqueous solution having a large heat capacity. Although the presence of water in the form of atmospheric moister is undesirable due to the occurrence of side reactions at a high temperature as described above, a relatively large amount of water is a suitable medium from the viewpoint of cooling rate. Thus, cooling with an aqueous solution is quite effective since that period of time at which the crude copolymer will be at a relatively high temperature where side reactions preferentially proceed can significantly be shortened.

It is preferable to add a neutralizing agent or a deactivator for the catalyst in the form of a basic compound to the aqueous solution to thereby neutralize or deactivate the catalyst simultaneously with cooling.

It is also preferred that the crude copolymer be in the form of fine particles when subjected to quenching and catalyst deactivation, particularly when the crude copolymer is formed by bulk polymerization techniques. Thus, pulverization of the crude copolymer is desirable. When the crude copolymer is in the form of relatively large particles, it is thus especially desirable to rapidly pulverize the particles in the cooling medium at an early stage during cooling.

According to the processes of the present invention, the catalyst can completely be neutralized and deactivated without being accompanied by any substantial side reaction for a long time thereafter by quenching the copolymerization product to 45° C. or lower, preferably between 35° to 15° C., within 30 seconds. After completely neutralizing and deactivating the catalyst, the crude copolymer will not experience any significant decrease in the degree of polymerization or the formation of unstable terminals even when the temperature is elevated during subsequent processing stages, unless an acidic medium is employed. Thus, the crude copolymer can be washed and dried at a relatively high temperature thereafter. On the contrary, an extremely low temperature of 10° C. or lower is not preferable, since the deactivation reaction would proceed very slowly and thus would require a very long period of time to complete.

Examples of the basic compound that may be used in the present invention for neutralizing and deactivating the catalyst include ammonia, amines such as triethylamine and tributylamine, alkali and alkaline earth metal hydroxides and other known deactivators for catalysts. It is preferable to dissolve these deactivators in the cooling medium for the crude copolymer, for example, in water or an organic solvent such as cyclohexane, benzene or toluene and thereby neutralize the catalyst by bringing the crude copolymer into contact with such catalyst-deactivators simultaneously with cooling of the copolymer. It is particularly preferable to formulate these deactivators into an aqueous solution.

Subsequent to the deactivation of the catalyst, the copolymer may be subjected, if necessary, to washing; separation and recovery of unreacted monomers and drying. Further stabilization of the copolymer may also be conducted, if necessary. Additives, such as various stabilizers may then be added to the copolymer which can thereafter be melt-kneaded and formulated into pellets to thereby yield a finished product. As described above, the POM copolymer of the present invention contains an extremely reduced amount of unstable terminals and, therefore, the processing load during the stabilization step is substantially relieved. Thus, a sufficiently stable copolymer can be obtained by a simple finishing treatment. Further, the residual unstable parts can be eliminated by volatilization in the melt-kneading extrusion step where, for example, stabilizers are added.

The process according to the present invention makes it possible to obtain a POM copolymer having a linear structure and an extremely high degree of polymerization (an MI or 2.0 or below, particularly, from 0.1 to 1.5 ) which cannot be obtained by conventional methods. This POM copolymer is applicable to processing by special molding, such as injection molding, extrusion molding, and blow-molding with expected property improvements, such and improved toughness. The copolymers obtained by the processes of the present invention contain a reduced amount of unstable terminal groups, which makes it possible to simplify the post-treatment and to give a final product having a high thermal stability. Therefore, the copolymers of this invention may be suitably molded so as to form parts and/or components for a number of end-use applications.

The following non-limiting Examples will further illustrate the present invention.

EXAMPLES

The following terms and measurement methods have been employed in the Examples and Comparative Examples.

% or ppm: by weight, unless otherwise noted.

Polymerization yield: the ratio (% by weight) of the obtained copolymer to the total starting monomers.

Melt index (MI): A melt index (g/10 min) measured at 190° C. under a load of 2160 g is given. This is evaluated as a characteristic corresponding to the molecular weight. That is, a lower MI means a larger molecular weight (provided that a small amount of a given stabilizer is added prior to measurement so as to prevent decomposition during measurement).

Alkali decomposition ratio (content of unstable parts): 1 g of a copolymer is added to 100 ml of a 50% aqueous solution of methanol containing 0.5% of ammonium hydroxide and heated in a closed container at 170° C. for 45 minutes. The amount of the formaldehyde decomposed and dissolved in the solution is then determined and expressed as a percentage based on the copolymer.

Thermal weight loss ratio: 5 g of a copolymer is pulverized and thoroughly mixed with a powdery stabilizer comprising 2,2'-methylenebis(4-methyl-6-t-butylphenol) (0.5%) and dicyandiamide (0.1%). After heating at 220° C. in ambient atmosphere for 45 minutes, the weight loss ratio is measured.

EXAMPLES 1 TO 5 AND COMPARATIVE EXAMPLES 1 to 3

Use was made of a continuous mixing reactor which had a cross-section composed of two circles partly overlapping each other and was provided with a barrel having an external jacket for passing a heating (cooling) medium therethrough and two internal rotating shafts having stirring/screwing paddles located in the direction of the major axis. Warm water at 80° C. was passed through the jacket and the two rotating shafts were rotated at a rate of 100 rpm. Trioxane as a main monomer containing 3.3% of 1,3-dioxolane as a comonomer and 700 ppm of methylal as a chain transfer agent was then continuously fed into one end of the reactor. Simultaneously, a 1% solution of boron trifluoride butyl etherate in cyclohexane was continuously added to the same end in such a rate as to give each concentration as specified in Table 1 based on the total amount of the monomers (trioxane plus 1,3-dioxolane), thus effecting copolymerization.

Table 1 shows the results of an analysis on the components and amounts of the impurities contained in the above-mentioned starting materials.

An aqueous solution containing 1,000 ppm of triethylamine at 20° C. (final amount: about 4 times as much) was thereafter added to the crude copolymer (about 90° C.) discharged from the outlet of the polymerizer immediately after the discharge. The mixture was pulverized and cooled to 45° C. within 20 seconds after the discharge and further cooled to 30° C. within 10 seconds thereafter. After stirring at this temperature for 60 minutes, the mixture was centrifuged and dried to thereby give the final copolymer.

Table 1 shows the polymerization yields and the properties of the obtained copolymers.

TABLE 1

| | Concn. of impurities in monomers (% by mole) | | | | Catalyst concn. (% by mole) | Polymn. yield (%) | Property of copolymer | | |
|---|---|---|---|---|---|---|---|---|---|
| | water | methanol | formic acid | total | | | MI (g/10 min) | alkali decompn. ratio (%) | thermal wt. loss ratio (%) |
| Ex. 1 | $3 \times 10^{-3}$ | $1 \times 10^{-3}$ | $1 \times 10^{-3}$ | $5 \times 10^{-1}$ | $2 \times 10^{-3}$ | 69 | 8.9 | 1.3 | 1.5 |
| Ex. 2 | $3 \times 10^{-3}$ | $1 \times 10^{-3}$ | $1 \times 10^{-3}$ | $5 \times 10^{-3}$ | $5 \times 10^{-3}$ | 73 | 9.2 | 1.5 | 1.7 |
| Ex. 3 | $2 \times 10^{-3}$ | $2 \times 10^{-3}$ | $1 \times 10^{-3}$ | $5 \times 10^{-3}$ | $1 \times 10^{-2}$ | 79 | 9.8 | 1.7 | 1.9 |
| Ex. 4 | $6 \times 10^{-3}$ | $2 \times 10^{-3}$ | $1 \times 10^{-3}$ | $9 \times 10^{-3}$ | $5 \times 10^{-3}$ | 70 | 9.5 | 1.7 | 1.8 |
| Ex. 5 | $6 \times 10^{-3}$ | $2 \times 10^{-3}$ | $1 \times 10^{-3}$ | $9 \times 10^{-1}$ | $1 \times 10^{-2}$ | 75 | 10.2 | 1.9 | 2.1 |
| Comp. Ex. 1 | $3 \times 10^{-3}$ | $1 \times 10^{-3}$ | $1 \times 10^{-3}$ | $5 \times 10^{-1}$ | $2 \times 10^{-2}$ | 83 | 14.7 | 4.5 | 4.9 |
| Comp. Ex. 2 | $1 \times 10^{-2}$ | $5 \times 10^{-3}$ | $5 \times 10^{-3}$ | $2 \times 10^{-2}$ | $5 \times 10^{-3}$ | 67 | 13.2 | 3.7 | 3.9 |
| Comp. Ex. 3 | $1 \times 10^{-2}$ | $5 \times 10^{-3}$ | $5 \times 10^{-3}$ | $2 \times 10^{-2}$ | $2 \times 10^{-2}$ | 78 | 16.3 | 5.2 | 5.7 |

EXAMPLES 6 TO 11 AND COMPARATIVE EXAMPLES 4 TO 7

Copolymerization was effected under the same conditions as those employed in the above Example 2 (refer to Table 1). The crude copolymer discharged from the outlet of the polymerizer was pulverized while mixing with each of the aqueous alkali solutions listed in Table 2. Thus, the catalyst was deactivated under the temperature conditions as specified in Table 2.

The temperature (cooling) conditions were controlled by adjusting the temperature and the amount of the employed aqueous alkali solution and by multi-stage addition at different temperatures. After cooling and stirring at the given temperature for 60 minutes, the mixture was centrifuged and dried to thereby give the final copolymer. In each case, the polymerization yield was about 72%. Table 2 shows the properties of the obtained copolymers.

TABLE 2

| | Alkali in added aq. soln. | Post-polymn. temp. condition | | Property of copolymer | | |
|---|---|---|---|---|---|---|
| | | 45° C./time required for reaching (sec) | final temp. (°C.)/ time required for reaching (sec) | MI (g/10 min) | alkali decompn. ratio (%) | thermal wt. loss ratio (%) |
| Ex. 6 | triethylamine | 45/30 | 45/30 | 9.8 | 1.9 | 2.1 |
| Ex. 7 | triethylamine | 45/30 | 30/45 | 9.3 | 1.6 | 1.7 |
| Ex. 8 | triethylamine | 45/25 | 30/35 | 9.2 | 1.6 | 1.7 |
| Ex. 9 | triethylamine | 45/15 | 30/25 | 9.1 | 1.4 | 1.5 |
| Ex. 10 | triethylamine | 45/10 | 20/30 | 9.1 | 1.3 | 1.4 |
| Ex. 11 | Ca(OH)$_2$ | 45/20 | 30/30 | 9.3 | 1.6 | 1.8 |
| Comp. Ex. 4 | triethylamine | 45/40 | 30/60 | 12.5 | 2.9 | 3.2 |
| Comp. Ex. 5 | triethylamine | 45/60 | 30/360 | 14.5 | 4.2 | 4.5 |
| Comp. Ex. 6 | triethylamine | (50)/30 | 50/30 | 14.9 | 4.7 | 5.0 |
| Comp. Ex. 7 | triethylamine | (70)/70 | 70/70 | 16.2 | 5.2 | 5.7 |

EXAMPLES 12 TO 16 AND COMPARATIVE EXAMPLES 8 TO 10

Use was made of a continuous mixing reactor which had a cross-section composed of two circles partly overlapping each other and was provided with a barrel having an external jacket for passing a heating (cooling) medium therethrough and two internal rotating shafts having stirring/screwing paddles located in the direction of the major axis. Warm water at 80° C. was passed through the jacket and the two rotating shafts were rotated at a rate of 100 r.p.m. Trioxane as a main monomer containing 3.3% of 1,3-dioxolane as a comonomer was then continuously fed into one end of the reactor. Simultaneously, a 1% solution of boron trifluoride butyl etherate in cyclohexane was continuously added to the same end in such a rate as to give each concentration as specified in Table 3 based on the total amount of the monomers (trioxane plus 1,3-dioxolane), thus effecting copolymerization.

Table 3 shows the results of an analysis on the components and amounts of the impurities contained in the above-mentioned starting materials.

Next, an aqueous solution containing 1,000 ppm of triethylamine at 20° C. (final amount: about 4 times as much) was added to the crude copolymer (about 90° C.) discharged from the outlet of the polymerizer immediately after the discharge. The mixture was pulverized and cooled to 45° C. within 20 seconds after the discharge and further cooled to 30° C. within 10 seconds thereafter. After stirring at this temperature for 60 minutes, the mixture was centrifuged and dried to thereby give the final copolymer.

Table 3 shows the polymerization yields and the properties of the obtained copolymers.

from the outlet of the polymerizer was pulverized while mixing with each of the aqueous alkali solutions listed i Table 4. Thus, the catalyst was deactivated under the temperature conditions as specified in Table 4.

The temperature (cooling) conditions were controlled by adjusting the temperature and the amount of the employed aqueous alkali solution and by multi-stage addition at different temperatures. After cooling and stirring at the given temperature for 60 minutes, the mixture was centrifuged and dried to thereby give the final copolymer. In each case, the polymerization yield was about 73%. Table 4 shows the properties of the obtained copolymers.

TABLE 4

|  | Alkali in added aq. soln. | Post-polymn. temp. condition | | Property of copolymer | | |
|---|---|---|---|---|---|---|
|  |  | 45° C./time required for reaching (sec) | final temp. (°C.)/ time required for reaching (sec) | MI (g/10 min) | alkali decompn. ratio (%) | thermal wt. loss ratio (%) |
| Ex. 17 | triethylamine | 45/30 | 45/30 | 1.5 | 1.9 | 2.1 |
| Ex. 18 | triethylamine | 45/30 | 30/45 | 1.0 | 1.7 | 1.7 |
| Ex. 19 | triethylamine | 45/25 | 30/35 | 0.5 | 1.7 | 1.8 |
| Ex. 20 | triethylamine | 45/15 | 30/25 | 0.1 | 1.3 | 1.3 |
| Ex. 21 | triethylamine | 45/10 | 20/30 | 0.1 | 1.2 | 1.3 |
| Ex. 22 | Ca(OH)$_2$ | 45/20 | 30/30 | 0.3 | 1.6 | 1.7 |
| Comp. Ex. 11 | triethylamine | 45/40 | 30/60 | 2.2 | 2.8 | 3.0 |
| Comp. Ex. 12 | triethylamine | 45/60 | 30/360 | 2.8 | 3.9 | 4.3 |
| Comp. Ex. 13 | triethylamine | (50)/30 | 50/30 | 3.4 | 4.3 | 4.8 |
| Comp. Ex. 14 | triethylamine | (70)/70 | 70/70 | 5.5 | 5.2 | 5.7 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. In a process for producing a polyoxymethylene copolymer by copolymerizing, in a copolymerization reaction system, trioxane with a cyclic ether or a cyclic formal in the presence of a catalyst consisting essentially of boron trifluoride or a coordination compound

EXAMPLES 17 TO 22 AND COMPARATIVE EXAMPLES 11 TO 14

Copolymerization was effected under the same conditions as those employed in the above Example 13 (refer to Table 3). The crude copolymer discharged thereof, the improvement comprising:

(a) conducting copolymerization while adjusting (1) the total content of impurities in the copolymerization reaction system to $1 \times 10^{-2}$ mole percent or less based on the total monomer amount, and (2)

TABLE 3

|  | Concn. of impurities in monomers (% by mole) | | | | Catalyst concn. (% by mole) | Polymn. yield (%) | Property of copolymer | | |
|---|---|---|---|---|---|---|---|---|---|
|  | water | methanol | formic acid | total |  |  | MI (g/10 min) | alkali decompn. ratio (%) | thermal wt. loss ratio (%) |
| Ex. 12 | $3 \times 10^{-3}$ | $1 \times 10^{-3}$ | $1 \times 10^{-3}$ | $5 \times 10^{-3}$ | $2 \times 10^{-3}$ | 70 | 0.1 | 1.2 | 1.4 |
| Ex. 13 | $3 \times 10^{-3}$ | $1 \times 10^{-3}$ | $1 \times 10^{-3}$ | $5 \times 10^{-3}$ | $5 \times 10^{-3}$ | 73 | 0.2 | 1.4 | 1.5 |
| Ex. 14 | $2 \times 10^{-3}$ | $2 \times 10^{-3}$ | $1 \times 10^{-3}$ | $5 \times 10^{-3}$ | $1 \times 10^{-2}$ | 80 | 0.5 | 1.6 | 1.8 |
| Ex. 15 | $6 \times 10^{-3}$ | $2 \times 10^{-3}$ | $1 \times 10^{-3}$ | $9 \times 10^{-3}$ | $5 \times 10^{-3}$ | 70 | 0.6 | 1.7 | 1.8 |
| Ex. 16 | $6 \times 10^{-3}$ | $2 \times 10^{-3}$ | $1 \times 10^{-3}$ | $9 \times 10^{-3}$ | $1 \times 10^{-2}$ | 76 | 1.3 | 2.0 | 2.1 |
| Comp. Ex. 8 | $3 \times 10^{-3}$ | $1 \times 10^{-3}$ | $1 \times 10^{-3}$ | $5 \times 10^{-3}$ | $2 \times 10^{-2}$ | 83 | 2.2 | 4.3 | 4.4 |
| Comp. Ex. 9 | $1 \times 10^{-2}$ | $5 \times 10^{-3}$ | $5 \times 10^{-3}$ | $2 \times 10^{-2}$ | $5 \times 10^{-3}$ | 65 | 2.4 | 4.0 | 4.2 |
| Comp. Ex. 10 | $1 \times 10^{-2}$ | $5 \times 10^{-3}$ | $5 \times 10^{-3}$ | $2 \times 10^{-1}$ | $2 \times 10^{-2}$ | 78 | 3.5 | 5.2 | 5.6 | the content of the catalyst in the copolymerization reaction system to between $1\times10^{-3}$ to $1\times10^{-2}$ mole percent based on the total monomer amount, to obtain a reaction mixture which includes crude polyoxymethylene copolymer; and then (b) deactivating the catalyst by quenching the reaction mixture to a temperature of 45° C. or less within 30 seconds after completion of the copolymerization according to step (a).

2. A claim process as in claim 1, wherein step (a) is practiced by adjusting the content of impurities which form unstable end groups on the polyoxymethylene copolymer or which which have a chain-terminating or chain-transfer function during polymerization.

3. A process as in claim 1 or 2, wherein step (a) is practiced by conducting copolymerization at a temperature between 60° to 105° C.

4. A process as in claim 1 or 2, wherein step (b) is practiced by contacting said reaction mixture with a cold solution containing a basic compound as a catalyst deactivator.

5. A process as in claim 4, wherein said solution is aqueous.

6. A process as in claim 4, wherein said solution is a non-aqueous solution containing an organic solvent for said basic compound.

7. A process as in claim 4, wherein said basic compound is at least one compound selected from the group consisting of ammonia, amines, and alkali and alkaline earth metal hydroxides.

8. A process as in claim 4, wherein said basic compound is triethylamine or tributylamine.

9. A process as in claim 1, wherein said polyoxymethylene copolymer is a linear polyoxymethylene copolymer of high degree of polymerization having a melt index of 2.0 g/10 min. or less.

10. A process for producing a polyoxymethylene copolymer comprising the steps of:

(a) forming a crude polyoxymethylene copolymer by subjecting a reaction mixture consisting essentially of trioxane, a cyclic ether or cyclic formal comonomer, and a catalyst to copolymerization reaction conditions;

(b) adjusting during copolymerization according to step (a), (1) the total content of impurities in the polymerization reaction mixture to $1\times10^{-2}$ mole percent or less based on the total monomer amount, and (2) the content of the catalyst in the copolymerization reaction mixture to between $1\times10^{-3}$ to $1\times10^{-2}$ mole percent based on the total monomer amount; and then (c) simultaneously (i) quenching the copolymerization reaction mixture containing the crude polyoxymethylene copolymer obtained by step (a) to a temperature of 45° C. or less within 30 seconds after completion of copolymerization according to step (a) and (ii) deactivating the catalyst in the copolymerization reaction mixture by bringing the copolymerization reaction mixture containing the crude polyoxymethylene copolymer into contact with a cold liquid which contains a catalyst deactivator after completion of the copolymerization according to step (a).

11. A process as in claim 10, wherein step (b) is practiced by adjusting the content of impurities which form unstable end groups on the polyoxymethylene copolymer or which which have a chain-terminating or chain-transfer function during polymerization.

12. A process as in claim 10 or 11, wherein step (a) is practiced by conducting copolymerization at a temperature between 60° to 105° C.

13. A process as in claim 10 or 11, wherein step (c) is practiced by contacting said copolymerization reaction mixture containing the crude polyoxymethylene copolymer with a cold solution containing a basic compound as a catalyst deactivator.

14. A process as in claim 13, wherein said solution is aqueous.

15. A process as in claim 13, wherein said solution is a non-aqueous solution containing an organic solvent for said basic compound.

16. A process as in claim 13, wherein said basic compound is at least one compound selected from the group consisting of ammonia, amines, and alkali and alkaline earth metal hydroxides.

17. A process as in claim 13, wherein said basic compound is triethylamine or tributylamine.

18. A process as in claim 10, wherein said polyoxymethylene copolymer is a linear polyoxymethylene copolymer of high degree of polymerization having a melt index of 2.0 g/10 min. or less as measured at 190° C. under a load of 2160 grams.

19. A process as in claim 1 or 10, wherein said cyclic ether or cyclic formal is present in the reaction system to yield between 0.2 to 10% by weight, based on the weight of trioxane, of units derived from said cyclic ether or cyclic formal in the polyoxymethylene copolymer.

20. A polyoxymethylene copolymer produced by the process of claim 1 or 10.

21. A polyoxymethylene copolymer as in claim 20, having a substantially linear structure and a melt index of 2.0 g/10 min. or less as measured at 190° C. under a load of 2160 grams.

22. A polyoxymethylene copolymer as in claim 20, wherein having between 0.2 to 10% by weight of units derived from said cyclic ether or cyclic formal based on the weight of said trioxane.

* * * * *